June 10, 1958 — J. J. FELTS ET AL — 2,838,322
VEHICLE FRAME
Filed Oct. 22, 1956 — 2 Sheets-Sheet 1
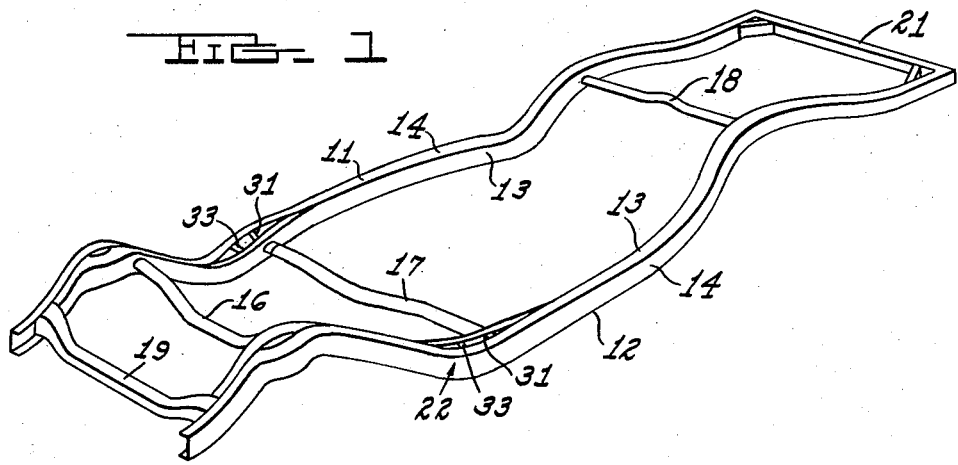
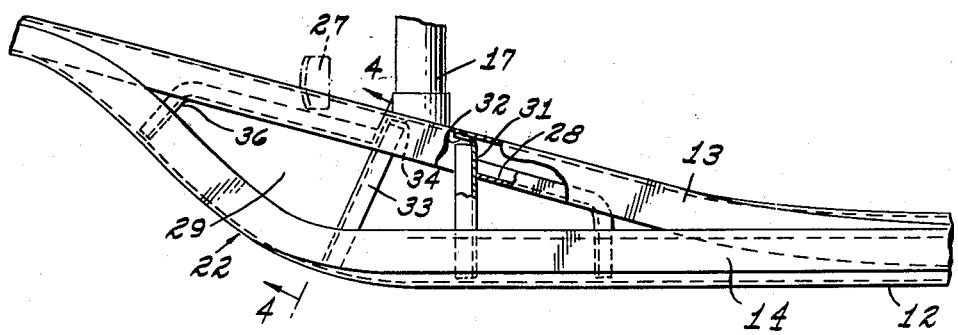
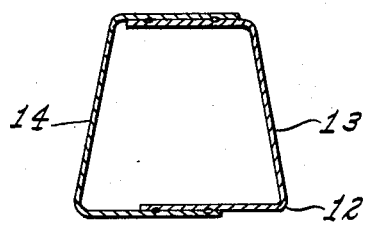
W. E. DAVIS
J. J. FELTS
E. C. McRAE
J. R. FAULKNER
T. H. OSTER
INVENTOR.
BY
ATTORNEYS June 10, 1958　　J. J. FELTS ET AL　　2,838,322
VEHICLE FRAME
Filed Oct. 22, 1956　　　　　　　　　　2 Sheets-Sheet 2
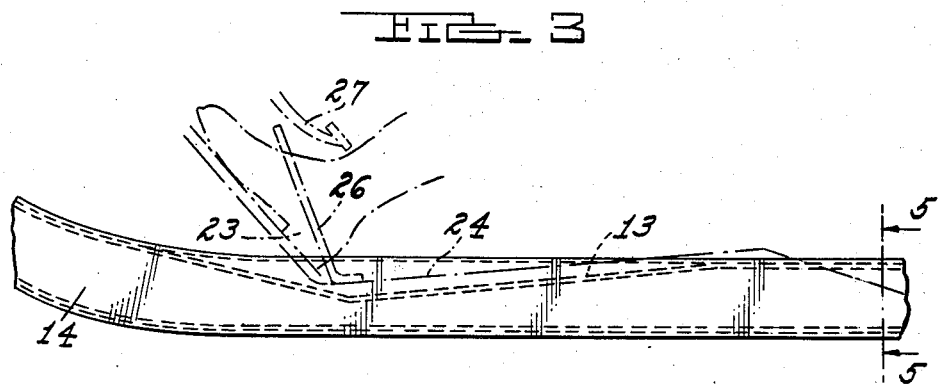
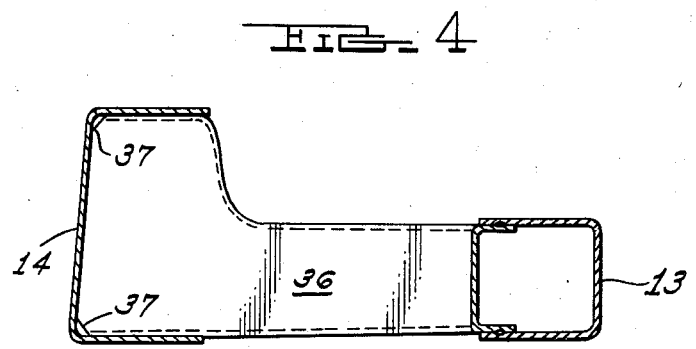
W. E. DAVIS
J. J. FELTS
INVENTOR.
E. C. MCRAE
BY　J. R. FAULKNER
T. H. OSTER
ATTORNEYS

United States Patent Office 2,838,322
Patented June 10, 1958

2,838,322

VEHICLE FRAME

Jerome J. Felts, Walled Lake, and William E. Davis, Northville, Mich., assignors to Ford Motor Company, Dearborn, Mich., a corporation of Delaware Application October 22, 1956, Serial No. 617,439

7 Claims. (Cl. 280—106)

This invention relates to an automobile frame and more particularly to a new and improved split frame side rail for providing greater depth in an automotive vehicle without weakening the frame structure.

The current trend in automobiles is to reduce the vehicle height which, of course, presents problems involving passenger comfort including ample leg room depth for the front seat occupants. As the vehicle height decreases leg room depth also decreases making it necessary to raise the front seat occupants' legs to a more uncomfortable horizontal, or extended position.

The object of this invention, therefore, is to provide a vehicle frame which permits additional leg room depth for the front seat occupants of a motor vehicle.

A further object is to provide an adequately rigid vehicle frame of a split rail type providing additional front occupant foot depth.

Still a further object is to provide a vehicle frame of a split rail type, simple in construction and capable of easy manufacture and relatively low in cost.

Other objects and advantages of this invention will be made more apparent when considered in connection with the accompanying drawings in which:

Figure 1 is a perspective view of a frame embodying the applicant's invention;

Figure 2 is an enlarged fragmentary view partly in section of the split rail feature of the vehicle frame;

Figure 3 is a side elevation of Figure 2 and showing the position of the operator's foot with relation to the vehicle frame;

Figure 4 is a section taken on the plane indicated by 4—4 of Figure 2; and

Figure 5 is a section taken on the plane indicated by 5—5 of Figure 3.

Referring now to the drawings, reference numeral 10 refers to a frame for an automotive vehicle which embodies a pair of longitudinally extending side rails 11 and 12 composed of a substantially U-shaped inner and outer rail sections 13 and 14 welded together most of their length with the open sections of the rails facing one another. Inner rail 13 is slightly smaller in width so that it will fit within the confines of the outer rail 14. The side rails 11 and 12 are held together in a rigid spaced apart parallel relationship by a plurality of tubular cross members 16, 17, and 18 and end rails 19 and 21 weldably secured to the rails 11 and 12.

The outer rails 14 are inwardly bowed as at 22 near their forward ends to provide clearance for the front wheels (not shown) and then extend forwardly to provide a support for the engine (not shown). Applicants' split rail frame structure commences rearwardly of the tubular cross member 17 at which point the inner rail 13 leaves the outer rail and extends diagonally forwardly across the inside of the bowed section 22 to again join the outer rail 14 at the completion of the bowed section.

As shown in Figure 5, the rails 13 and 14 prior to their separation are generally trapezoidal in assembled cross section and from this point on forwardly the outer rail 14 maintains substantially the same cross section configuration whereas the inner rail 13 decreases in size to almost one half the height of the outer rail at its lowest point, which is near the heel 23 of the occupant's shoe as it rests on the forward part of the floor board 24. The relative position of the floor board 24, the accelerator pedal 26, and the suspended brake pedal 27 with respect to the inner rail 13 and outer rail 14 is shown in Figure 3.

The inner rail 13 then increases in cross section height until it blends into the outer rail. It is to be noted that the decrease in size of the inner rail 13 is accomplished by removal of metal from the top whereas the bottom is still in substantially the same horizontal plane of the outer rail. At the point where the rails 13 and 14 are separated a plurality of sheet metal bulkheads of L-shaped configurations are weldably secured to the inside of both the inner and outer rails as shown in Figure 2 for maintaining proper rigidity of the two rails. A rearwardly extending bulkhead 28, substantially U-shaped in cross section, is weldably secured to the inside of the inner rail 13 and is bent laterally outwardly across the opening 29 between the rails and is secured to the outer rail 14 in a transverse position. Forwardly of the bulkhead 28 and in contact with the forward edge thereof is a transversely extending bulkhead 31 which is in substantial parallel alignment with tubular cross member 16. Bulkhead 31 is U-shaped in cross section and has an outer bent lip 32 weldably secured to the inside of the inner rail 13 and is, of course, secured to the inside of the outer rail 14 by the same welding means. An angled transversely extending bulkhead 33 almost symmetrically opposite to the bulkhead 31 spans the space 29 and is again weldably secured to both rails. An outer bent lip 34 is weldably secured to the inner rail 13 in the same manner as the lip 32 of the opposing bulkhead 31. The structure is completed by weldably securing a forwardly extending bulkhead 36 also U-shaped in cross section along the length of the inner rail and bending it outwardly to span the space 29 and secure it in transverse alignment to the outer rail 14 just prior to the point where the two rails converge. It is to be noted that the bulkheads 28, 31, 33 and 36 are substantially reduced in height at the point where they extend beyond the outer rail 14 to the height of the inside of the inner rail 13. This is shown in Figure 4. It also is to be noted that all of the bulkheads are L-shaped in configuration, the extent of the L being determined by the point at which the bulkheads join the inner rail. At the point where the bulkheads are secured transversely to the rails, a chamfer 37 is made of the corners to provide easy access to the inside of the rail as is shown in Figure 4.

Referring again to Figure 3 it can be seen that the floor board 24 is suitably formed to follow the configuration of the inner rail 13 and the bulkheads 28, 31, 33, and 36 thus providing additional foot area for the occupants of the front seat which is below the top of the outer rail 14. Thus the applicants have successfully provided additional leg room area for the occupants of the front seat of a vehicle without sacrificing rigidity in the frame side rails. Should support for the floor pan inward of the outer rails of the frame be required, it may be easily accomplished by the provision of appropriate spacers.

It is to be understood that the invention is not to be limited to the exact construction shown and described, but that various changes and modifications may be made without departing from the spirit and scope of the invention, as defined in the appended claims.

What is claimed is:

1. A frame for an automotive vehicle comprising in combination a pair of longitudinally extending outer side rails substantially parallel at their medial and rearward ends and bowed inwardly at their forward ends, a reciprocal inner side rail fixedly attached to each of the outer side rails at the forward portion of the bowed outer rail and rearwardly thereof of the bowed section throughout its extent and defining a space between said rails at the bowed section of the outer rail, said inner rail being smaller in height than said outer side rail between said points of attachment, a plurality of cross members fixedly secured to said attached rails and maintaining them in a fixed spaced apart relationship, and stamped means, including a plurality of bulkheads crossing said space between said inner and outer rails and means for fixedly securing said bulkheads to said frame members in a rigid non-movable assembly.

2. The structure defined by claim 1 which is further characterized in that the inner and outer side rails are substantially U-shaped in cross section, that the inner rail between the points of attachment forward and aft of the bowed outer rail section is progressively diminished in height from its point of attachment to the outer rail rearward of the bow substantially the extent of said bow then is progressively inverted in height to the point of attachment with the outer rail forward of the bowed section, said stamped means comprising a plurality of bulkheads U-shaped in cross section, said bulkheads fitting within the inside of the U-shaped inner and outer rails, and means fixedly securing said bulkheads comprising a plurality of welds joining said bulkheads to said rails.

3. A ladder type frame for an automotive vehicle having a pair of longitudinally extending side rails and a plurality of transversely aligned cross members rigidly secured to said rails and maintaining said rails in a predetermined spaced apart relationship, said side rails comprising a pair of outer channel shaped members bent arcuately inwardly and defining a front wheel housing area and then extending generally forwardly to define an engine support, a pair of inner channel shaped members weldably joined within said outer channels to the forwardly extending outer rail section and rearwardly of said arcuate inwardly bent section, said inner rail diagonally crossing said arcuate formed outer rail section and defining an open spaced area between said rails, said inner channel progressively decreasing in height from said juncture rearwardly of said open spaced area to a point medially of said open spaced area and progressively increasing in height to the height of the inner side of said outer channel section, and means fixedly joining the said outer and inner rail by transversing said open space area.

4. The structure defined by claim 3 which is further characterized in that said means comprises a plurality of L-shaped bulkheads, channel shaped in cross section and rigidly secured to the inside of the inner and outer rails, said bulkheads comprising a longitudinally rearwardly extending first bulkhead secured to the inside of said inner rail and bent outwardly to transversely join to the outer rail, a second transversely aligned bulkhead with the closed section of the bulkhead contacting the forward edge of the longitudinally rearwardly extending bulkhead and extending across said space and joined in transverse alignment to the inner and outer rails, a third bulkhead transversely aligned to the inner and outer rails and spanning the space with the open side of the bulkhead facing the second bulkhead, a fourth longitudinally forwardly extending bulkhead secured to the inside of the inner rail having its rearward edge contact the closed side of the third bulkhead and bent laterally outwardly to join the outer rail in transverse alignment thereto adjacent the forward extending section of the outer rail.

5. A vehicular frame comprising in combination a pair of longitudinally extending outer side rails bowed inwardly at their forward ends, an inner side rail secured to each of the outer side rails at the forward portion of the bowed outer rail and rearwardly thereof of the bowed section throughout its extent and defining a space between said rails at the bowed section of the outer rail, said inner rail being reduced in height with respect to said outer rail between said points of attachment.

6. A vehicular frame of the ladder type having a pair of side rails and a plurality of transverse cross members secured to said rails and maintaining said rails in a predetermined spaced apart relationship, each of said side rails comprising an outer channel shaped member bent arcuately inwardly and defining a front wheel housing area and then extending generally forwardly to define an engine support and an inner channel shaped member secured within said outer channel member to the forwardly extending outer channel member and rearwardly of said arcuate inwardly bent section, said inner channel member defining an open spaced area between said outer channel member and said inner channel member at said arcuate section, said inner channel member being shallower in cross section than said outer channel shaped member.

7. A frame for an automotive vehicle comprising in combination a pair of longitudinally extending outer side rails substantially parallel at their medial and rearward ends and bowed inwardly at their forward ends, a reciprocal inner side rail fixedly attached to each of the outer side rails at the forward portion of the bowed outer rail and rearwardly thereof of the bowed section throughout its extent and defining a space between said rails at the bowed section of the outer rail, the top of said inner rail being disposed substantially below the top of the outer rail between said points of attachment.

References Cited in the file of this patent

UNITED STATES PATENTS

| 2,066,352 | Kliesrath | Jan. 5, 1937 |
| 2,384,096 | Kishline | Sept. 4, 1945 |
| 2,669,462 | Toncray | Feb. 16, 1954 |

FOREIGN PATENTS

| 456,412 | Great Britain | Nov. 9, 1936 |